United States Patent Office 3,036,137
Patented May 22, 1962

3,036,137
PURIFICATION OF GAS MIXTURES
Anthony Arthur Leonard Challis and William Edward Alexander Mitchell, Norton-on-Tees, England, assignors to Imperial Chemical Industries Limited, London, England, a corporation of Great Britain
No Drawing. Filed July 8, 1959, Ser. No. 825,667
Claims priority, application Great Britain July 16, 1958
11 Claims. (Cl. 260—677)

This invention relates to the purification of gas mixtures.

In the production of propylene by the cracking of hydrocarbons, it is usual to find that the propylene contains methylacetylene as an undesirable impurity. It is, therefore, advantageous for this methylacetylene to be removed.

One manner of removing methylacetylene is to submit the gas mixture containing it to a hydrogenation step, in which the methylacetylene is hydrogenated to propylene. For this reaction to be carried out satisfactorily, the amount of hydrogen present must be carefully regulated, otherwise there is a danger of an undesirable amount of propylene being hydrogenated to propane. It is not an easy matter to supply the desired amount of hydrogen since this is relatively small and the metering of small quantities of gas is a troublesome matter.

We have now found that it is possible to make use of the solubility of hydrogen in propylene to control the amount of hydrogen present in the hydrogenation step.

Thus, according to the present invention, there is provided a process for the production of propylene which is substantially free from methylacetylene in which a liquid hydrocarbon mixture comprising propylene and a minor amount of methylacetylene is raised to a desired pressure in the presence of a hydrogen-nitrogen mixture of a predetermined composition so that the liquid hydrocarbon dissolves an amount of hydrogen suitable for the hydrogenation step, removing the said liquid hydrocarbon together with the dissolved hydrogen, vaporising the hydrocarbon whereby a mixture of hydrogen and hydrocarbon vapour is obtained and passing this mixture over a hydrogenation catalyst maintained at a suitable temperature.

By operating in this manner, the amount of hydrogen dissolved in the liquid hydrocarbon mixture can be controlled by the pressure and composition of the hydrogen-nitrogen mixture. In general, it is suitable for the amount of hydrogen to be of the order of 1 mole per 100 moles of propylene. Such a hydrogen concentration is suitable when dealing with propylene containing commonly encountered amounts of methylacetylene. The pressure of the hydrogen-nitrogen mixture in contact with the hydrocarbon mixture may conveniently be 250 lbs. per square inch and the gas mixture may suitably consist of 95% by volume of nitrogen and 5% by volume of hydrogen. Provided that the hydrocarbon composition is removed at a reasonably constant temperature, the amount of hydrogen dissolved in this will be substantially constant. The mixture may be vaporised, for example at a temperature in the neighbourhood of 45° C., when the pressure is 250 lbs. per square inch, and the hydrocarbon-hydrogen mixture may be fed at once to a hydrogenation zone.

It is a further feature of the present invention that the step in which the liquid hydrocarbon mixture is contacted under pressure with the hydrogen-nitrogen gas mixture may be a fractionation in which the still is of the total condensation type. In this way requisite amounts of hydrogen may be dissolved in the propylene-rich hydrocarbon mixture without having to subject the latter to an additional step.

Having produced the hydrocarbon-hydrogen mixture of suitable composition this may be contacted with a catalyst comprising 0.01% to 0.1% by weight of a metal of group 8 of the periodic system supported on gamma alumina, the catalyst being maintained at a temperature of 100° to 120° C.

As a preferred catalyst, 0.02% to 0.05% by weight of palladium on gamma alumina may be employed. This catalyst may be prepared by precipitating aluminium hydroxide from a solution of aluminium nitrate by the addition of aqueous ammonia. After filtering, the precipitate may be washed, dried, calcined at a temperature of, for example, 450° C., and pelleted in the presence of a suitable pelleting agent, for example 3% by weight of graphite. The pellets may then be saturated with a solution containing the requisite quantity of palladium salt, for example palladious nitrate, $Pd(NO_3)_2$. The pellets may then be dried at, for example, 120° C., and heated at an elevated temperature of, for example, 400° C., in a stream of hydrogen for several hours.

If desired, the catalyst may contain an alkali metal salt. Thus, gamma alumina, which may or may not contain an alkali metal salt, may be impregnated with a solution of an alkali metal carbonate, for example sodium carbonate, to give a product containing for example 1% by weight of $Na_2O$, expressed on a dry basis. This alkalised alumina may then be impregnated with a palladium salt and the product treated in hydrogen as disclosed above.

It is a feature of the present invention that if the hydrocarbon mixture employed as starting material contains, for example, 0.1% to 0.2% by weight of allene, this is no longer detectable (that is, it is present in an amount less than 200 parts per million) after the hydrogenation step disclosed in this application has been carried out. It is believed that this may be due to the fact that the allene is isomerised to methylacetylene and subsequently this compound is hydrogenated to propylene. It is not, however, intended that the observed removal of allene should be in any way dependent upon the correctness of this theory.

Also, if the propylene to be purified contains a small quantity of vinylacetylene, this is also undetectable after the partial hydrogenation process of the present invention.

In carrying out the process of the present invention, it is convenient to contact the gas mixture comprising propylene and hydrogen with the catalyst at a space velocity in the range of 500 to 1500 litres of gas per litre of catalyst-filled space per hour. In particular, a space velocity of 1000 is satisfactory.

When using gas mixtures produced as disclosed in this application containing up to 1 mole of hydrogen per 100 moles of propylene and contacting them with a hydrogenation catalyst, for example of the type disclosed, maintained at a suitable temperature of, for instance, 100 to 120° C., it is possible to decrease a methylacetylene content of for example 50 p.p.m.–0.3% by volume to 1 part per million, while any allene and vinylacetylene present may be decreased to concentrations at which they are no longer detectable.

We claim:
1. A process for the purification of propylene contaminated with methyl acetylene whereby said methyl acetylene contaminant is converted to propylene, which process comprises subjecting said contaminated propylene mixture to an elevated pressure sufficient to liquefy said contaminated propylene mixture and contacting the liquid mixture with a hydrogen-nitrogen gas mixture, whereby hydrogen gas is dissolved in said liquid propylene in an amount and at a rate dependent upon the composition of the hydrogen-nitrogen mixture and the pressure, maintaining contact between the liquefied contaminant propyl- ene mixture and the hydrogen-nitrogen gas mixture for a period of time sufficient to permit an amount of hydrogen gas, sufficient only to hydrogenate said contaminant, to be absorbed by and dissolved in the liquid propylene, separating the hydrogen-nitrogen gas mixture from the liquefied contaminant-propylene mixture thereafter vaporizing the liquefied contaminated propylene mixture containing dissolved hydrogen, thereby forming a vapor mixture of propylene, contaminant and dissolved hydrogen gas, passing said vapor mixture over a hydrogenation catalyst maintained at a temperature sufficient to hydrogenate said methyl acetylene contaminant to propylene gas whereby there is obtained propylene substantially free from methyl acetylene.

2. A process as claimed in claim 1 in which the mixture of propylene contaminant and the dissolved hydrogen gas contains on the order of 1 mole of hydrogen per 100 moles of propylene.

3. A process as claimed in claim 1 in which the contaminated propylene contains from 50 parts per million to 0.3% by volume of methylacetylene.

4. A process as claimed in claim 1 in which the catalyst comprises 0.02 to 0.05% by weight of palladium on gamma alumina.

5. A process as claimed in claim 1 in which the catalyst contains an alkali metal.

6. A process as claimed in claim 1 in which the catalyst contains 1% by weight of sodium expressed as $Na_2O$.

7. A process as claimed in claim 1 in which the contaminated propylene mixture also comprises minor amounts of at least one member selected from the group consisting of allene and vinylacetylene.

8. A process as claimed in claim 1 in which the vapor mixture of propylene, methyl acetylene and hydrogen is contacted with the catalyst at a space velocity in the range of 500 to 1500 litres of gas per litre of catalyst-filled space per hour.

9. A process as claimed in claim 1 in which the space velocity is 1000.

10. A process for the purification of propylene contaminated with methyl acetylene whereby said methyl acetylene contaminant is converted to propylene, which process comprises subjecting said contaminated propylene mixture in the liquid state to a pressure of about 250 pounds per square inch while in contact with a hydrogen-nitrogen gas mixture containing 95% by volume of nitrogen and 5% by volume of hydrogen, whereby hydrogen gas is dissolved in said liquid propylene in an amount controlled by the thereby established composition and pressure, maintaining said contact for a period of time sufficient to permit the desired predetermined amount of hydrogen gas sufficient only to hydrogenate said contaminant to be absorbed by and dissolved in the liquid propylene, separating the liquefied contaminated propylene mixture from the nitrogen-hydrogen gas mixture, thereafter vaporizing the liquid propylene mixture at a temperature of 45° C., and then passing the vapor mixture of propylene, methyl acetylene, and hydrogen over a hydrogenation catalyst maintained at a temperature sufficient to hydrogenate said methyl acetylene contaminant to propylene gas, whereby there is obtained propylene substantially free from methyl acetylene.

11. The process of claim 10, wherein said catalyst comprises from 0.01% to 0.1% by weight of a metal of group VIII of the period system supported on gamma alumina, and said catalyst is maintained at a temperature in the range of about 100° to 120° C.

References Cited in the file of this patent

UNITED STATES PATENTS

| | | |
|---|---|---|
| 1,842,010 | Braus | Jan. 19, 1932 |
| 2,359,759 | Hebbard et al. | Oct. 10, 1944 |
| 2,379,670 | Welling et al. | July 3, 1945 |
| 2,401,444 | Welling | June 4, 1946 |
| 2,906,790 | Smyth | Sept. 29, 1959 |
| 2,946,829 | Likins et al. | July 26, 1960 |